US010419354B2

(12) United States Patent
Li et al.

(10) Patent No.: US 10,419,354 B2
(45) Date of Patent: Sep. 17, 2019

(54) CONGESTION AVOIDANCE OVER A TRANSMISSION CONTROL PROTOCOL (TCP) FLOW THAT INVOLVES ONE OR MORE DEVICES USING ACTIVE QUEUE MANAGEMENT (AQM), BASED ON ONE OR MORE TCP STATE CONDITIONS

(71) Applicant: Verizon Patent and Licensing Inc., Arlington, VA (US)

(72) Inventors: Feng Li, Lexington, MA (US); Jae Won Chung, Lexington, MA (US); Haim S. Ner, Fair Lawn, NJ (US); Eduard Rubinshtein, Belmont, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 15/418,305

(22) Filed: Jan. 27, 2017

(65) Prior Publication Data
US 2018/0219787 A1 Aug. 2, 2018

(51) Int. Cl.
*H04L 12/807* (2013.01)
*H04W 28/02* (2009.01)
*H04L 12/841* (2013.01)
*H04L 12/801* (2013.01)

(52) U.S. Cl.
CPC ......... *H04L 47/27* (2013.01); *H04W 28/0273* (2013.01); *H04L 47/12* (2013.01); *H04L 47/283* (2013.01)

(58) Field of Classification Search
USPC ........................................................ 370/230
See application file for complete search history.

(56) References Cited

U.S. PATENT DOCUMENTS

| 7,787,372 B2 * | 8/2010 | Agarwal | H04W 80/06 |
| | | | 370/230 |
| 2001/0032269 A1 * | 10/2001 | Wilson | H04L 47/10 |
| | | | 709/235 |
| 2002/0099854 A1 * | 7/2002 | Jorgensen | H04L 1/20 |
| | | | 709/249 |

(Continued)

OTHER PUBLICATIONS

Wikipedia, "TCP Congestion Control," https://en.wikipedia.org/wiki/TCP_congestion_control, Jan. 19, 2017, 13 pages.

*Primary Examiner* — Alpus Hsu
*Assistant Examiner* — Hooman Houshmand

(57) ABSTRACT

A device can determine a congestion window (CWND) value, associated with a first transmission control protocol (TCP) state, for a TCP flow that involves one or more devices using active queue management (AQM). The first TCP state to cause the CWND value to be increased at a particular rate. The device can determine a round trip time (RTT) value, associated with the first TCP state, for the TCP flow. The device can determine that one or more TCP state conditions are satisfied. The device can classify the TCP flow into a different TCP state. The different TCP state to cause the CWND value to be maintained, decreased, or increased at a rate that is different than the particular rate. The device can transmit one or more packets, associated with the TCP flow, based on classifying the TCP flow into the different TCP state.

20 Claims, 7 Drawing Sheets

(56) References Cited

U.S. PATENT DOCUMENTS

| | | | | |
|---|---|---|---|---|
| 2002/0181494 A1* | 12/2002 | Rhee | H04L 29/06 | 370/465 |
| 2006/0045008 A1* | 3/2006 | Sun | H04L 47/10 | 370/229 |
| 2006/0045011 A1* | 3/2006 | Aghvami | H04L 47/10 | 370/230 |
| 2007/0280115 A1* | 12/2007 | Meyer | H04L 47/10 | 370/236 |
| 2008/0043620 A1* | 2/2008 | Ye | H04L 47/10 | 370/232 |
| 2010/0020686 A1* | 1/2010 | Lee | H04L 41/5003 | 370/231 |
| 2010/0195494 A1* | 8/2010 | Sun | H04L 47/10 | 370/230 |
| 2010/0329117 A1* | 12/2010 | Lee | H04B 7/18586 | 370/235 |
| 2013/0114408 A1* | 5/2013 | Sastry | H04W 28/02 | 370/231 |
| 2014/0098668 A1* | 4/2014 | Kakadia | H04L 47/30 | 370/235 |
| 2014/0241163 A1* | 8/2014 | Lee | H04W 48/16 | 370/235 |
| 2015/0029887 A1* | 1/2015 | Briscoe | H04L 47/326 | 370/252 |
| 2015/0172984 A1* | 6/2015 | Racz | H04W 56/001 | 370/331 |
| 2015/0188830 A1* | 7/2015 | Zhao | H04L 47/27 | 370/235 |
| 2017/0289041 A1* | 10/2017 | Li | H04L 29/06 | |
| 2018/0083878 A1* | 3/2018 | Francini et al. | | |

\* cited by examiner

CONGESTION AVOIDANCE OVER A TRANSMISSION CONTROL PROTOCOL (TCP) FLOW THAT INVOLVES ONE OR MORE DEVICES USING ACTIVE QUEUE MANAGEMENT (AQM), BASED ON ONE OR MORE TCP STATE CONDITIONS

BACKGROUND

In Transmission Control Protocol (TCP), a congestion window is a flow control mechanism that is based on a network capacity and/or a network loading condition. The congestion window can prevent a link between a server device and a client device from becoming overloaded with network traffic. Additionally, the congestion window can be calculated based on estimating congestion between the server device and the client device.

DETAILED DESCRIPTION OF PREFERRED EMBODIMENTS

Figure 1A:
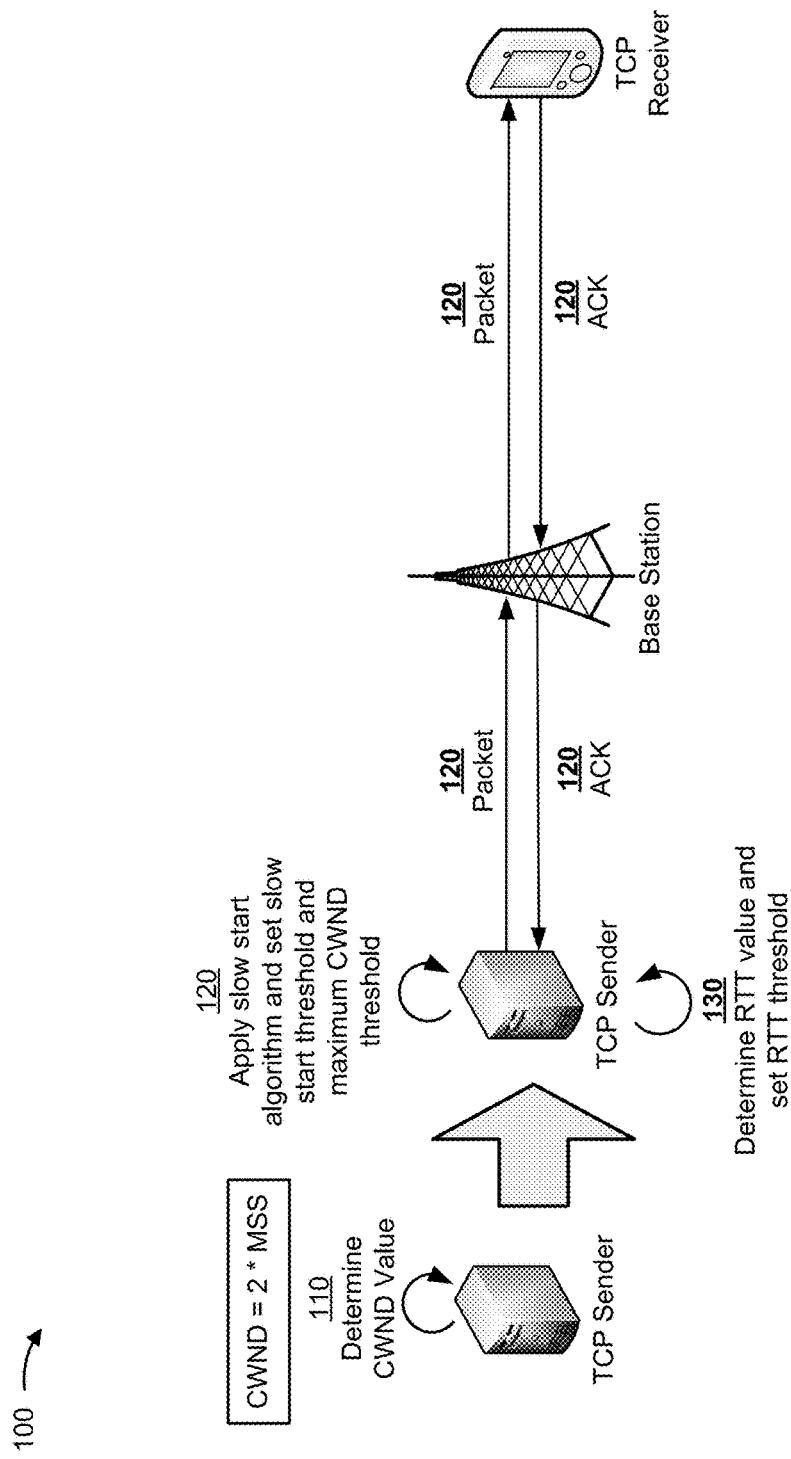
FIGS. 1A-1D are diagrams of an overview of an example implementation described herein.

The following detailed description of example implementations refers to the accompanying drawings. The same reference numbers in different drawings can identify the same or similar elements.

In wireless networks, particular TCP congestion-avoidance algorithms can utilize different states (e.g., a slow start state, a congestion avoidance state, etc.) to help manage network congestion. For example, a TCP sender can apply a congestion-avoidance algorithm to classify a particular TCP flow into a particular TCP state, and can perform one or more actions to manage network traffic based on the classification. In some cases, a network device associated with the TCP flow, such as a base station (e.g., an eNodeB), can apply active queue management (AQM) to further manage network congestion. For example, when the network is experiencing heavy traffic, a queue associated with the base station can fill up, causing network congestion. In this case, AQM can allow the base station to drop packets that have been in the queue for longer than a threshold period of time.

However, applying AQM in a TCP flow that also applies a TCP congestion-avoidance algorithm can cause unnecessary retransmission of packets and lead to a decrease in throughput. For example, the TCP sender can apply a TCP congestion-avoidance algorithm that involves increasing a rate at which packets are transmitted to another device (e.g., a base station, a router, etc.). In this case, the other device can apply AQM (which can be independent of the TCP congestion-avoidance algorithm). As the rate at which the TCP sender transmits packets to the other device increases, a queue associated with the other device can fill up, which can increase the time it takes the other device to process the packets in the queue. However, if the other device is applying AQM, the packets can be dropped from the queue after a threshold is satisfied (e.g., a threshold period of time passes, a quantity of packets satisfied a queue size threshold, etc.). This can cause an unnecessary retransmission of packets and lead to a decrease in throughput.

Implementations described herein implement a TCP congestion-avoidance algorithm over a TCP flow that involves one or more devices using AQM, where the congestion-avoidance algorithm allows a device (e.g., a TCP sender) to intelligently transition between different states (e.g., a slow start state, a stable state, a congestion avoidance state) by determining whether a congestion window (CWND) value and a round trip time (RTT) value satisfy one or more TCP state conditions. By intelligently transitioning between different states based on one or more TCP state conditions, the device is able to utilize the congestion-avoidance algorithm without causing another device (e.g., a base station) that uses AQM to drop packets, which increases throughput and conserves network resources. Furthermore, the device is able to utilize a stable state, in addition to the slow start state and congestion avoidance state, which reduces instances of state oscillation where the device oscillates between states.

FIGS. 1A-1D are diagrams of an overview of an example implementation 100 described herein. For FIGS. 1A-1D, assume a TCP flow is established between a TCP sender and a TCP receiver, using a base station as an intermediary. Further assume that one or more devices involved in the TCP flow use AQM, and that the TCP sender and/or the TCP receiver manage traffic with a congestion-avoidance algorithm. The congestion-avoidance algorithm allows the TCP sender to perform different actions based on whether the TCP sender classifies the TCP flow into a slow start state, a stable state, or a congestion avoidance state.

For FIG. 1A, assume the TCP sender begins transmitting traffic to the TCP receiver, and that the TCP sender classifies the TCP flow into a slow start state to manage traffic flow. As shown in FIG. 1A, and by reference number 110, the TCP sender can determine a CWND value, and the CWND value can indicate a quantity of packets that the TCP sender can transmit. For example, the TCP sender can determine the CWND value during a "three-way-handshake" process with the TCP receiver (e.g., based on comparing timestamps associated with a synchronize (SYN) message, a synchronize-acknowledgement (SYN-ACK) message, and an acknowledgement (ACK) message). The three-way-handshake can include information indicating a maximum segment size (MSS), and the MSS can be used to determine the CWND value (e.g., the CWND value is shown as two times the MSS).

As shown by reference number 120, the TCP sender can apply a slow start algorithm, associated with the slow start state, to increase the CWND value. For example, the slow start algorithm can include transmitting packets to the TCP receiver, which can cause the TCP receiver to transmit acknowledgement (ACK) packets to the TCP sender. When the ACK packets are received, the TCP sender can increase the CWND (e.g., by a value of one), which can cause the TCP sender to increase a rate at which packets are transmitted to the TCP receiver. Additionally, the TCP sender can set a slow start threshold (a first threshold) to a value that indicates a particular amount of network congestion, and the TCP sender can use the slow start threshold to determine whether to classify the TCP flow into another state, such as the stable state, as discussed further herein. Additionally, or alternatively, the TCP sender can set a maximum CWND threshold (a second threshold) to a value that indicates a ceiling for the CWND value (e.g., a value that the CWND value cannot exceed).

As shown by reference number 130, the TCP sender can determine an RTT value, based on an amount of time for packets to be transmitted and acknowledged between devices involved in the TCP flow. In some cases, the TCP sender can set an RTT threshold (a second threshold, or a third threshold) to a value that indicates a particular amount of network congestion (e.g., by using an average RTT value), and the TCP sender can use the RTT threshold to classify the TCP flow into another state, such as the congestion avoidance state, as discussed further herein.

By setting thresholds to values that indicate particular amounts of network congestion, the TCP sender is able to monitor the rate at which packets are transmitted over the TCP flow. In this way, the TCP sender is able to manage network congestion in a manner that prevents AQM packet drop, as described further herein.

Figure 1B:
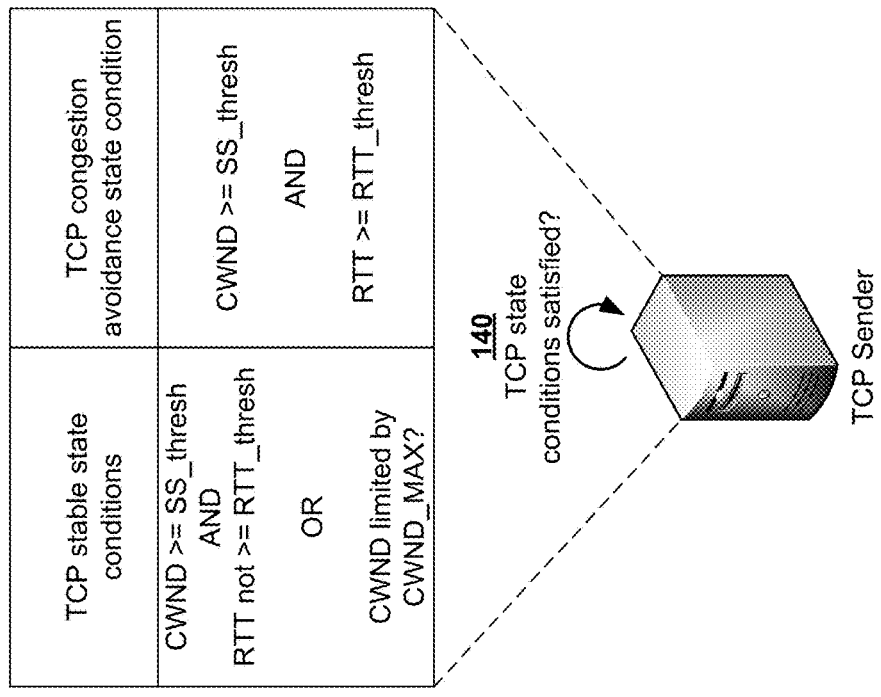

As shown in FIG. 1B, and by reference number 140, the TCP sender can determine whether one or more TCP state conditions are satisfied. For example, while in the slow start state, the TCP sender can compare the CWND value and the RTT value with one or more thresholds, and can determine whether one or more TCP state conditions (e.g., a stable state condition, a congestion avoidance state condition, etc.) are satisfied based on a result of comparing the CWND value and the RTT value with the one or more thresholds.

In some implementations, a stable state condition can be satisfied if the CWND value satisfies (e.g., is greater than or equal to) the slow start threshold and if the RTT value does not satisfy (e.g., is not greater than or equal to) the RTT threshold. Additionally, or alternatively, the stable state condition can be satisfied if the CWND value satisfies (e.g., is limited by) the maximum CWND threshold (e.g., which can be calculated by a congestion controller). Additionally, or alternatively, a congestion avoidance state condition can be satisfied if the CWND value satisfies (e.g., is greater than or equal to) the slow start threshold, and if the RTT value satisfies (e.g., is greater than or equal to) the RTT threshold. If one of the TCP state conditions is satisfied, the TCP sender can classify the TCP flow into another TCP state (e.g., a stable state, a congestion avoidance state, etc.). By intelligently transitioning between TCP states based on TCP state conditions, the TCP sender is able to apply the particular state algorithm that prevents AQM packet drop, which causes an increase in throughput for the TCP flow.

Figure 1C:
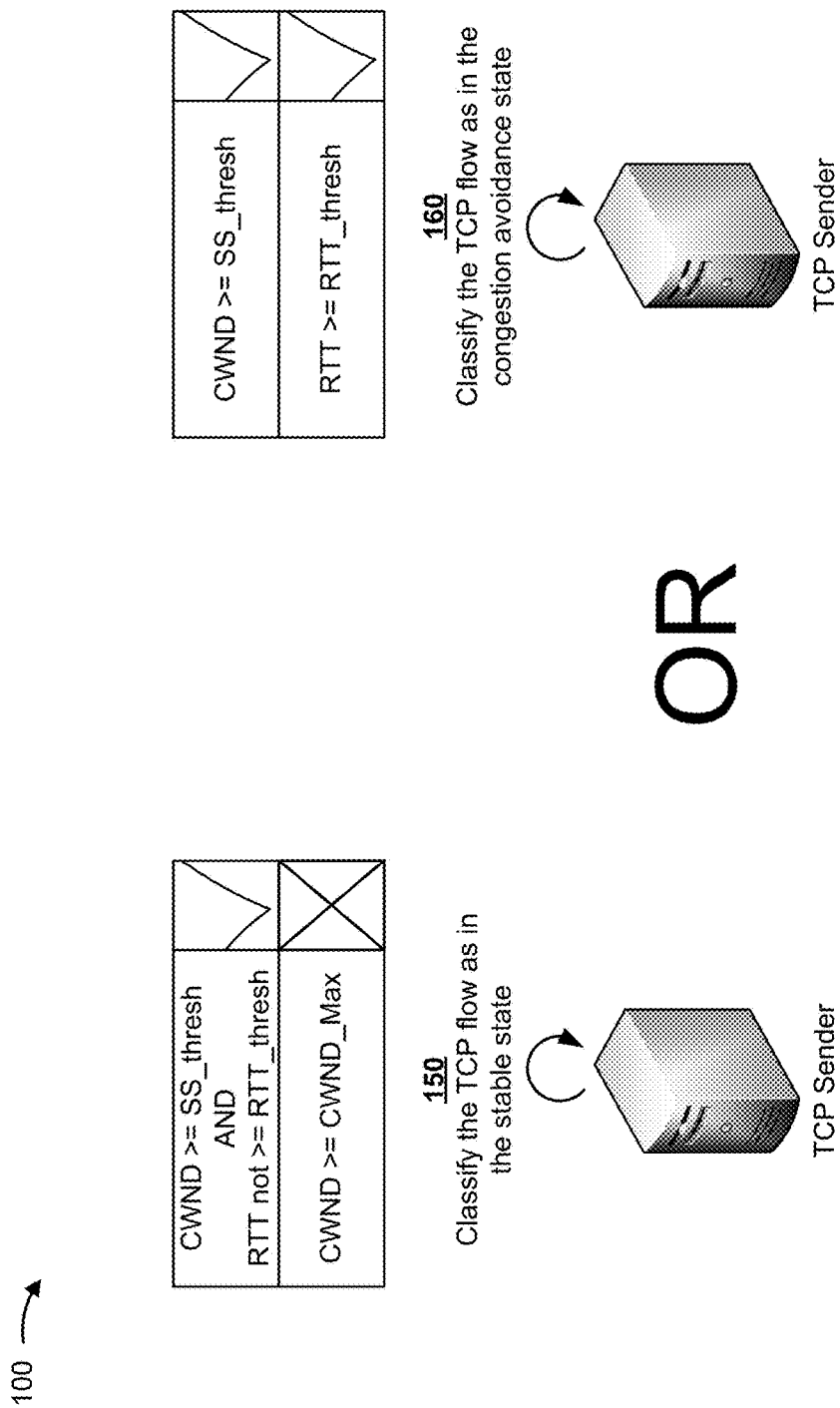

As shown in FIG. 1C, and by reference number 150, the TCP sender can classify the TCP flow into the stable state by determining that the CWND value satisfies the slow start threshold and by determining that the RTT value does not satisfy the RTT threshold. While in the stable state, the TCP sender can maintain a particular CWND value, and can continue transmitting packets to the TCP receiver. By maintaining the CWND value, despite the CWND value satisfying the slow start threshold, the TCP sender conserves processing resources by reducing unnecessary instances of state oscillation.

As shown by reference number 160, the TCP sender can classify the TCP flow into a congestion avoidance state by determining that the CWND value satisfies the slow start threshold and the RTT value satisfies the RTT threshold. While in the congestion avoidance state, the TCP sender can attempt to reduce network congestion by applying a congestion avoidance algorithm. In this case, the TCP sender can reduce network congestion by increasing the CWND value at a slower rate than the rate used by the previous state (e.g., the rate used by the stable state or the slow start state). By increasing the CWND value at a slower rate than the rate used by the previous state, during periods of network congestion, the TCP sender decreases the RTT value (e.g., to a value that is lower than an AQM value), which prevents AQM packet drop and increases throughput by reducing a quantity of packet retransmissions.

Figure 1D:
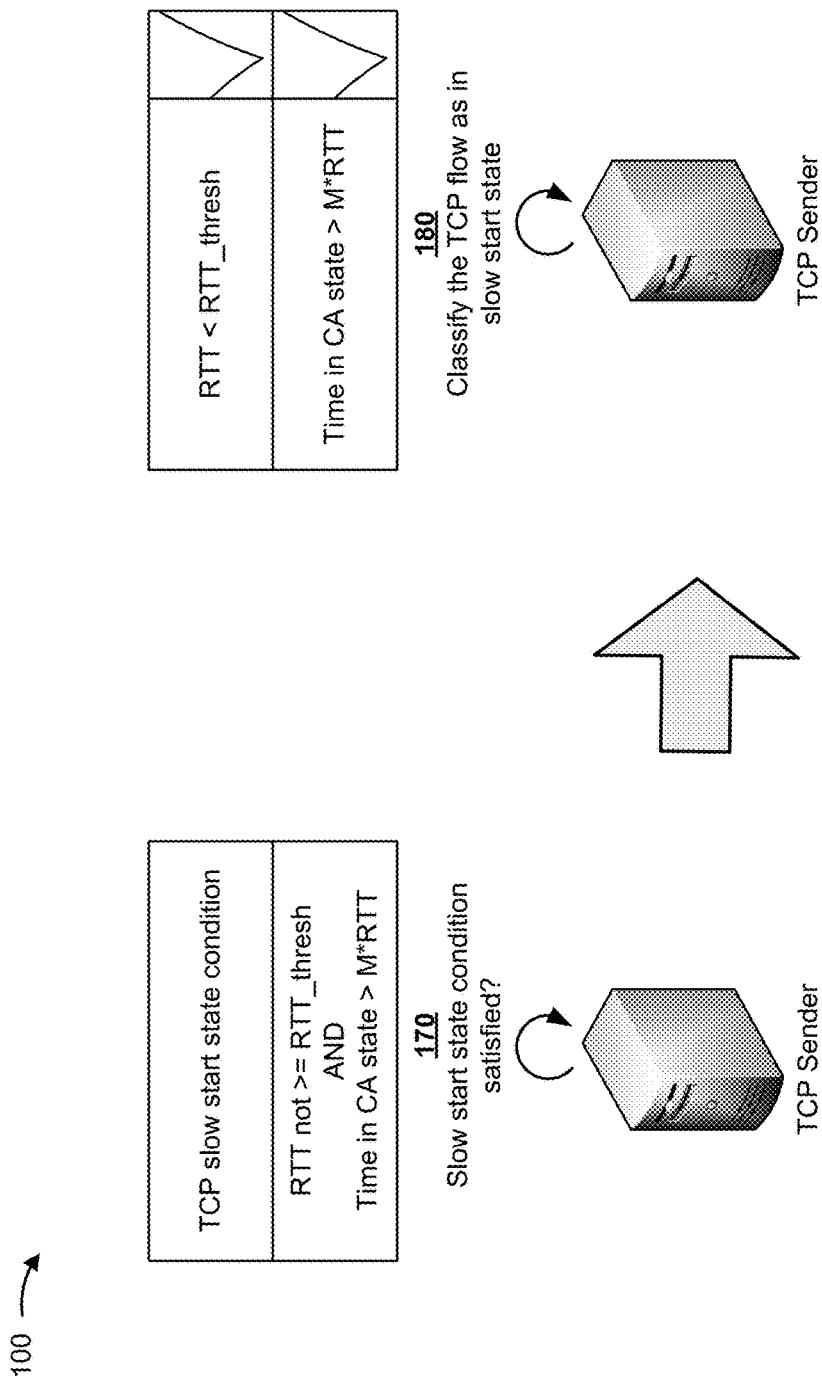

As shown in FIG. 1D, and by reference number 170, the TCP sender can determine whether a slow start state condition is satisfied. For example, while in the congestion avoidance state, the TCP sender can determine whether a slow start state condition is satisfied by comparing the RTT value and the RTT threshold, and by verifying whether the TCP flow has been in the congestion avoidance state for longer than a threshold time period (e.g., M*RTT). As shown by reference number 180, if the slow start state condition is satisfied, the TCP sender can classify the TCP flow into the slow start state. For example, the TCP sender can classify the TCP flow into the slow start state if the RTT value satisfies the RTT threshold and if the TCP flow remains in the congestion avoidance state for longer than the threshold time period.

By intelligently transitioning between TCP states based on TCP state conditions, the TCP sender is able to manage the CWND value and the RTT value in a manner that prevents a network device (e.g., a base station) involved in the TCP flow from using AQM to drop packets. In this way, the TCP sender increases throughput, and conserves processing resources and network resources.

As indicated above, FIGS. 1A-1D are provided merely as an example. Other examples are possible and can differ from what was described with regard to FIGS. 1A-1D. For example, while the functions performed in FIGS. 1A-1D are carried out by the TCP sender, the same or similar functions can be performed by a TCP proxy device or a network device associated with a TCP flow that involves one or more devices using AQM.

Figure 2:
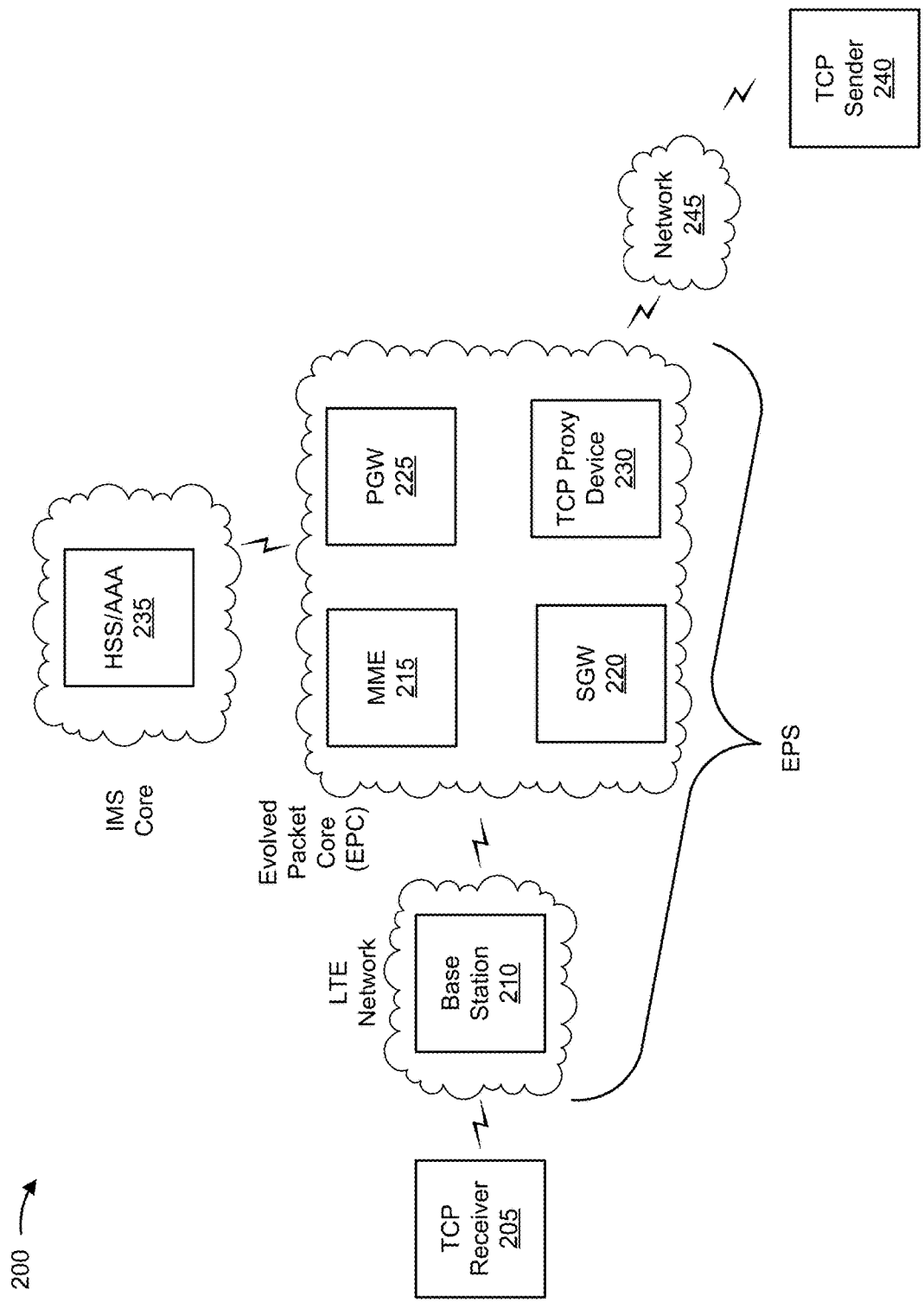
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a TCP receiver 205, a base station 210, a mobility management entity (MME) 215, a serving gateway (SGW) 220, a packet data network (PDN) gateway (PGW) 225, a TCP proxy device 230, a home subscriber server/authentication, authorization, and accounting server (HSS/AAA) 235, a TCP sender 240, and/or a network 245. Devices of environment 200 can interconnect via wired connections, wireless connections, or a combination of wired and wireless connections.

Some implementations are described herein as being performed within a fourth generation (4G) long-term evolution (LTE) network for explanatory purposes. Some implementations can be performed within a network that is not an LTE network, such as a fifth generation (5G) network, a third generation (3G) network, or a code division multiple access (CDMA) network.

Environment 200 can include an evolved packet system (EPS) that includes an LTE network and/or an evolved packet core (EPC) that operate based on a 3GPP wireless communication standard. The LTE network can include a radio access network (RAN) that includes one or more base stations 210 that take the form of evolved Node Bs (eNBs) via which TCP receiver 205 communicates with the EPC. The EPC can include MME 215, SGW 220, and/or PGW 225 that enable TCP receiver 205 to communicate with network 245 and/or an Internet protocol (IP) multimedia subsystem (IMS) core. The IMS core can include HSS/AAA 235, and can manage device registration and authentication, session initiation, etc., associated with TCP receiver 205. HSS/AAA 235 can reside in the EPC and/or the IMS core.

TCP receiver 205 includes one or more devices capable of receiving, storing, processing, and/or providing packets. For example, TCP receiver 205 can include a communication device, such as a mobile phone (e.g., a smart phone or a radiotelephone), a tablet computer, a wearable communication device (e.g., a smart wristwatch or a pair of smart eyeglasses), a desktop computer, a server computer, or a similar type of device. In some implementations, TCP receiver 205 can transmit packets to and/or receive packets from network 245 via base station 210 (e.g., based on a radio access bearer between TCP receiver 205 and SGW 220). For example, for a TCP flow, TCP receiver 205 can receive one or more packets from TCP sender 240, and can transmit one or more ACK packets to TCP sender 240. In some cases, TCP receiver 205 can use AQM to help manage network congestion.

Base station 210 includes one or more devices capable of transferring traffic (e.g., packets), such as audio, video, text, and/or other traffic, destined for and/or received from TCP receiver 205. In some implementations, base station 210 can include an eNB associated with the LTE network that receives traffic from and/or transmits traffic to network 245 via SGW 220 and/or PGW 225. Additionally, or alternatively, one or more base stations 210 can be associated with a RAN that is not associated with an LTE network. Base station 210 can transmit traffic to and/or receive traffic from TCP receiver 205 via an air interface (e.g., a radio frequency (RF) signal). In some implementations, base station 210 can include a small cell base station, such as a base station of a microcell, a picocell, and/or a femtocell. In some cases, base station 210 can use AQM to help manage network congestion.

MME 215 includes one or more devices, such as one or more server devices, capable of managing authentication, activation, deactivation, and/or mobility functions associated with TCP receiver 205. In some implementations, MME 215 can perform operations relating to authentication of TCP receiver 205. Additionally, or alternatively, MME 215 can facilitate the selection of a particular SGW 220 and/or a particular PGW 225 to serve traffic to and/or from TCP receiver 205. MME 215 can perform operations associated with handing off TCP receiver 205 from a first base station 210 to a second base station 210 when TCP receiver 205 is transitioning from a first cell associated with the first base station 210 to a second cell associated with the second base station 210. Additionally, or alternatively, MME 215 can select another MME (not pictured), to which TCP receiver 205 should be handed off (e.g., when TCP receiver 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 can aggregate traffic received from one or more base stations 210 associated with the LTE network, and can transmit the aggregated traffic to network 245 (e.g., via PGW 225) and/or other network devices associated with the EPC and/or the IMS core. Additionally, or alternatively, SGW 220 can receive traffic from network 245 and/or other network devices, and can transmit the received traffic to TCP receiver 205 via base station 210. Additionally, or alternatively, SGW 220 can perform operations associated with handing off TCP receiver 205 to and/or from an LTE network.

PGW 225 includes one or more devices capable of providing connectivity for TCP receiver 205 to external packet data networks (e.g., other than the depicted EPC and/or LTE network), such as network 245. For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can transmit the aggregated traffic to network 245. Additionally, or alternatively, PGW 225 can receive traffic from network 245, and can transmit the traffic to TCP receiver 205 via SGW 220 and base station 210. PGW 225 can record data usage information (e.g., byte usage), and can provide the data usage information to HSS/AAA 235.

TCP proxy device 230 includes one or more devices capable of receiving, storing, processing, and/or providing information associated with a CWND value and/or an RTT value. For example, TCP proxy device 230 can include a server device (e.g., a TCP proxy server), a cloud computing device, or a similar device. In some implementations, TCP proxy device 230 can receive traffic from TCP sender 240 (e.g., via network 245) and can provide the traffic to TCP receiver 205 (e.g., via base station 210). In some cases, TCP proxy device 230 can use AQM to help manage network congestion. Additionally, or alternatively, one or more functions carried out by TCP sender 240 can be carried out by TCP proxy device 230.

HSS/AAA 235 includes one or more devices, such as one or more server devices, capable of managing (e.g., receiving, generating, storing, processing, and/or providing) information associated with TCP receiver 205. For example, HSS/AAA 235 can manage subscription information associated with TCP receiver 205, such as information that identifies a subscriber profile of a user associated with TCP receiver 205, information that identifies services and/or applications that are accessible to TCP receiver 205, location information associated with TCP receiver 205, a network identifier (e.g., a network address) that identifies TCP receiver 205, information that identifies a treatment of TCP receiver 205 (e.g., quality of service information, a quantity of minutes allowed per time period, a quantity of data consumption allowed per time period, etc.), information that identifies whether TCP receiver 205 is associated with an RF access signaling usage control policy and/or an RF access signaling usage billing policy, and/or similar information. HSS/AAA 235 can provide this information to one or more other devices of environment 200 to support the operations performed by those devices.

Additionally, or alternatively, HSS/AAA 235 can perform authentication operations for TCP receiver 205 and/or a user of TCP receiver 205 (e.g., using one or more credentials), can control access, by TCP receiver 205, to a service and/or an application (e.g., based on one or more restrictions, such as time-of-day restrictions, location restrictions, single or multiple access restrictions, read/write restrictions, RF access signaling usage restrictions, etc.), can track resources consumed by TCP receiver 205 (e.g., a quantity of voice minutes consumed, a quantity of data consumed, a quantity of RF signals transmitted, a quantity of radio access bearers requested and/or established, etc.), and/or can perform similar operations.

TCP sender 240 includes one or more devices capable of receiving, storing, processing, and/or providing packets. For example, TCP sender 240 can include a server device (e.g., a host server, a web server, an application server, etc.), a cloud computing device, or a similar device. In some implementations, for a TCP flow, TCP sender 240 can use a CWND value to determine a quantity of packets to transmit to TCP receiver 205, and can receive ACK packets from TCP receiver 205. In some implementations, TCP sender 240 can classify a TCP flow into a particular TCP state based on one or more TCP state conditions. In some cases, TCP sender 240 can use AQM to help manage network congestion.

Network 245 includes one or more wired and/or wireless networks. For example, network 245 can include a cellular network (e.g., a 5G network, a 4G network, such as a LTE network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
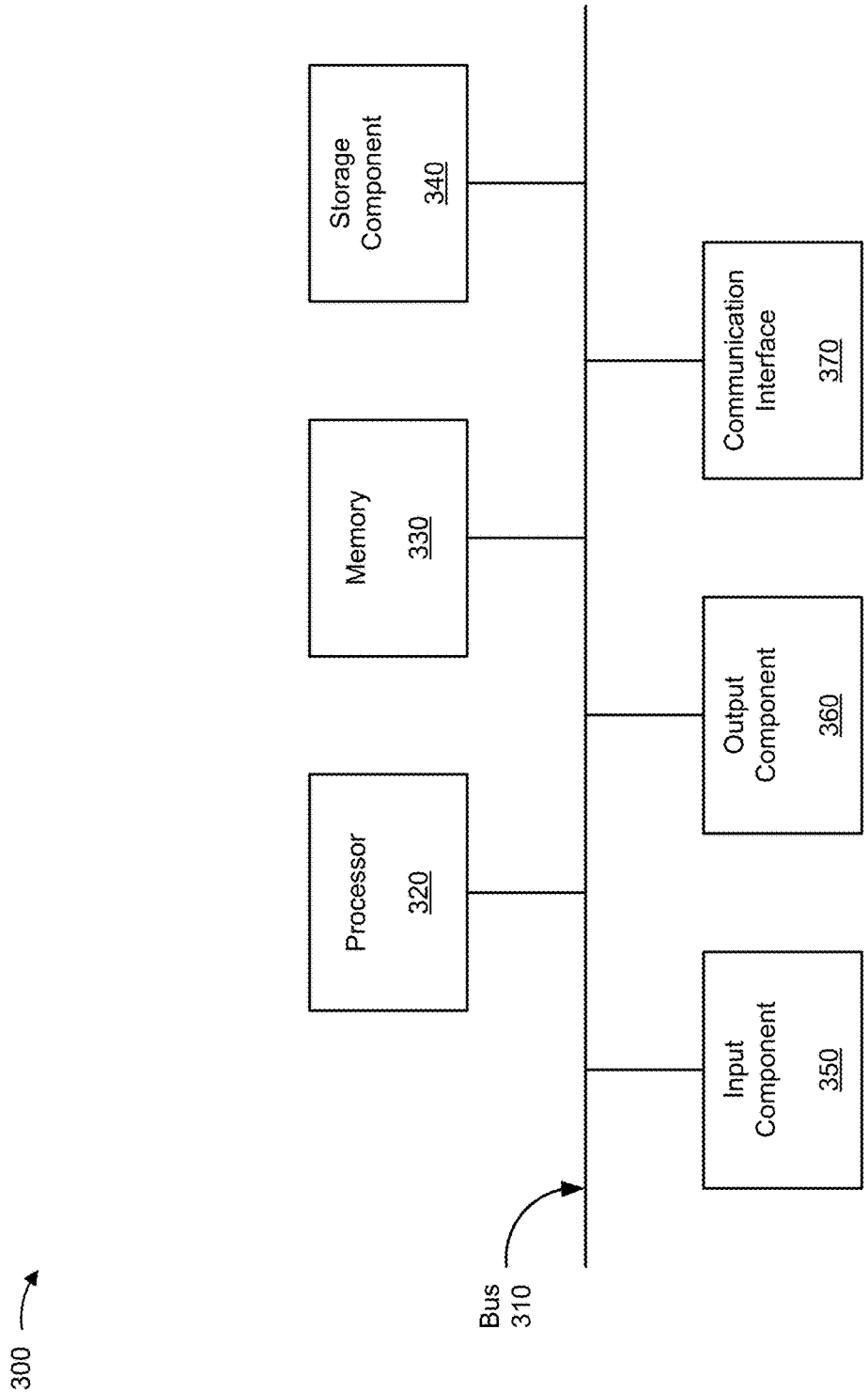
FIG. 3 is a diagram of example components of one or more devices of FIG. 2.

FIG. 3 is a diagram of example components of a device 300. Device 300 can correspond to TCP receiver 205, base station 210, MME 215, SGW 220, PGW 225, TCP proxy device 230, HSS/AAA 235, and/or TCP sender 240. In some implementations, TCP receiver 205, base station 210, MME 215, SGW 220, PGW 225, TCP proxy device 230, HSS/AAA 235, and/or TCP sender 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
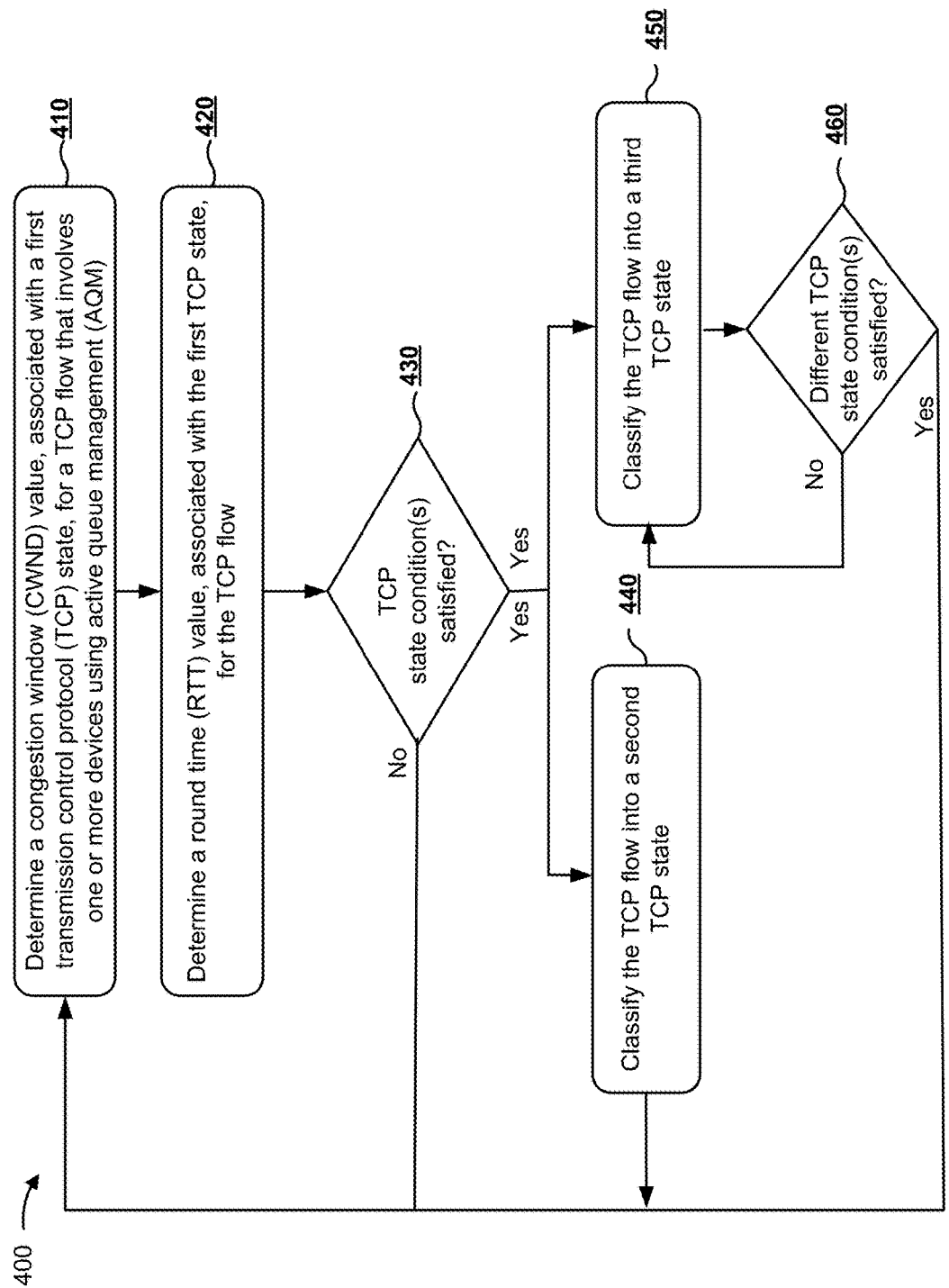
FIG. 4 is a flow chart of an example process for managing network congestion over a TCP flow that involves one or more network devices using active queue management (AQM).

FIG. 4 is a flow chart of an example process 400 for managing network congestion over a TCP flow with network devices that use AQM. In some implementations, one or more process blocks of FIG. 4 can be performed by TCP sender 240. In some implementations, one or more process blocks of FIG. 4 can be performed by another device or a group of devices separate from or including TCP sender 240, such as TCP receiver 205, base station 210, MME 215, SGW 220, PGW 225, TCP proxy device 230, and/or HSS/AAA 235.

As shown in FIG. 4, process 400 can include determining a congestion window (CWND) value, associated with a first transmission control protocol (TCP) state, for a TCP flow that involves one or more devices using active queue management (AQM) (block 410). For example, TCP sender 240 can determine a CWND value based on information exchanged when a TCP flow is initially established, and TCP sender 240 can classify the TCP flow into a first TCP state. A TCP state can be associated with one or more algorithms, processing operations, sets of actions, or the like. In this case, the first TCP state can be associated with a slow start algorithm, and the slow start algorithm can be used to determine subsequent CWND values (e.g., by increasing the CWND value at a particular rate). The CWND value can indicate a quantity of packets to transmit to TCP receiver 205. As used herein, a packet can refer to a communication structure for communicating information, such as a protocol data unit (PDU), a network packet, a frame, a datagram, a segment, a message, a block, a cell, a subframe, a slot, a symbol, a portion of any of the above, and/or another type of formatted or unformatted unit of data capable of being transmitted via a network. In some implementations, TCP sender 240 can implement the slow start algorithm over a TCP flow that involves one or more devices using AQM, such as a TCP flow that establishes a connection between TCP receiver 205 and TCP sender 240, using base station 210 as an intermediary.

In some implementations, TCP sender 240 can determine a CWND value based on information exchanged when a TCP flow is initially established. For example, during a "three-way-handshake" process (e.g., which includes a SYN message, a SYN-ACK message, and an ACK message), TCP sender 240 and TCP receiver 205 can determine a maximum segment size (MSS), and the CWND value can be set based on the MSS, such as a multiple of the MSS value, as a particular MSS value, as an average of multiple received MSS values, or the like. In this case, TCP sender 240 can use the CWND value to determine the quantity of packets to transmit to TCP receiver 205. In this way, TCP sender 240 is able use information exchanged while establishing the TCP flow to set the CWND value, which has the effect of improving network performance.

In some implementations, TCP sender 240 can apply a slow start algorithm to determine subsequent CWND values. For example, TCP sender 240 can transmit a quantity of packets associated with the CWND value determined during the three-way handshake, and can increase (e.g., by a value of one) the CWND value when an ACK packet is received in response to TCP sender 240 sending a packet to TCP receiver 205. By increasing the CWND value when the ACK packet is received, TCP sender 240 increases the rate at which packets are transmitted over the TCP flow.

Additionally, or alternatively, TCP sender 240 can increase the CWND value until a slow start threshold is satisfied. For example, the slow start threshold can be set to an initial value (e.g., a fixed value, such as 65,535 bytes), and TCP sender 240 can increase the CWND value until the CWND value satisfies the slow start threshold. When the CWND value satisfies the slow start threshold, TCP sender 240 can classify the TCP flow into a different state, such as a stable state, as described further herein.

Additionally, or alternatively, TCP sender 240 can increase the CWND value until a maximum CWND threshold is satisfied. For example, TCP sender 240 can set a maximum CWND threshold, which can indicate a ceiling for the CWND value. In this case, while applying the slow start algorithm, TCP sender 240 can transmit no more than a quantity of packets equal to the maximum CWND threshold. When the CWND value satisfies the maximum CWND threshold, TCP sender 240 can classify the TCP flow into a different state, such as a stable state, as described further herein.

In some implementations, the maximum CWND threshold can be set to an advertised receive window (RWND) value. For example, while applying the slow start algorithm, TCP sender 240 can only transmit a quantity of packets equal to a minimum of the CWND value and an RWND value (e.g., a value that indicates an amount of buffer space available at TCP receiver 205). In this case, TCP sender 240 can set the maximum CWND threshold to the RWND value, and if the CWND value satisfies the maximum CWND threshold, then TCP sender 240 can classify the TCP flow into a stable state, as described further herein.

In some implementations, TCP sender 240 can apply the slow start algorithm to a TCP flow that involves one or more devices using AQM, such as a TCP flow that establishes a connection between TCP receiver 205 and TCP sender 240, using base station 210 (e.g. an eNodeB) as an intermediary. For example, one or more devices associated with the TCP flow can use AQM (e.g., base station 210), and AQM can cause the one or more devices to drop packets that remain in a queue for longer than a threshold period of time.

As further shown in FIG. 4, process 400 can include determining a round trip time (RTT) value, associated with the first TCP state, for the TCP flow (block 420). For example, TCP sender 240 can, as part of the slow start algorithm, determine an RTT value by determining an amount of time for packets to be transmitted and acknowledged between devices involved in the TCP flow (e.g., between TCP receiver 205 and TCP proxy device 230, between TCP receiver 205 and TCP sender 240, between TCP proxy device 230 and TCP sender 240, etc.).

In some implementations, TCP sender 240 can set an RTT threshold. For example, TCP sender 240 can set the RTT threshold to a value indicating an average RTT. In this case, TCP sender 240 is able to identify when the TCP flow has RTT values that satisfy (e.g., are greater than or equal to) the RTT threshold. The larger the RTT value, the longer packets are waiting in queues of one or more devices associated with the TCP flow. If the RTT value satisfies the RTT threshold, as described further herein, the RTT value can indicate to TCP sender 240 that a queue associated with the TCP flow is filling up, prior to AQM causing packets to drop from the queue.

In some implementations, TCP sender 240 can set an RTT threshold to a value that is lower than an AQM value used to drop packets from a queue. As an example, a network device of the TCP flow (e.g., base station 210) can use AQM to drop packets that remain in the queue for longer than 500 milliseconds (ms), and TCP sender 240 can set the RTT threshold to a value that is lower than 500 ms, such as 400 ms. In this way, TCP sender 240 is able identify that the queue associated with the TCP flow is filling up, prior to AQM causing packets to drop from the queue.

As further shown in FIG. 4, process 400 can include determining whether one or more TCP state conditions are satisfied, based on determining the CWND value and the RTT value (block 430). In some implementations, while in the first TCP state, TCP sender 240 can determine whether one or more TCP state conditions, associated with a second TCP state (e.g., a stable state), are satisfied, by comparing the CWND value and/or the RTT value and one or more thresholds. In some implementations, a TCP state condition, of the one or more TCP state conditions, can be satisfied if the CWND value satisfies the slow start threshold. In some implementations, a TCP state condition, of the one or more TCP state conditions, can be satisfied if the RTT value does not satisfy the RTT threshold. In some implementations, a TCP state condition, of the one or more TCP state conditions, can be satisfied if the CWND value satisfies the slow start threshold and the RTT value does not satisfy the RTT threshold. In some implementations, a TCP state condition, of the one or more TCP state conditions, can be satisfied if the CWND value satisfies the maximum CWND value. In some implementations, a TCP state condition, of the one or more TCP state conditions, can be satisfied based on any combination of the above conditions.

Additionally, or alternatively, while in the first TCP state, TCP sender 240 can determine whether the one or more TCP state conditions, associated with a third TCP state (e.g., a congestion avoidance state), are satisfied, by comparing the CWND value and/or the RTT value and one or more thresholds. In some implementations, a TCP state condition, of the one or more TCP state conditions, can be satisfied if the CWND value satisfies the slow start. In some implementations, a TCP state condition, of the one or more TCP state conditions, can be satisfied if the RTT value satisfies the RTT threshold. In some implementations, a TCP state condition, of the one or more TCP state conditions, can be satisfied if the CWND value satisfies the slow start threshold and the RTT value satisfies the RTT threshold. In some implementations, a TCP state condition, of the one or more TCP state conditions, can be satisfied based on any combination of the above conditions.

Depending on which TCP state conditions are satisfied, TCP sender 240 can selectively classify the TCP flow into a different TCP state (e.g., the second state, the third state, etc.) and, in the different TCP state, TCP sender 240 can apply a corresponding algorithm to reduce or eliminate AQM packet drops, which increases throughput for the TCP flow. In some implementations, the corresponding algorithm can set a rate for increasing or decreasing the CWND value based on selectively classifying the TCP flow into the different TCP state. Additionally, or alternatively, TCP sender 240 can modify the CWND value, as a modified CWND value, based on selectively classifying the TCP flow into the different TCP state. In this case, TCP sender 240 can transmit one or more packets, associated with the TCP flow, based on the modified CWND value.

In some cases, in addition to determining whether the one or more TCP state conditions are satisfied, TCP sender 240 can verify that the RTT value is lower than an AQM value associated with another device associated with the TCP flow. For example, TCP sender 240 can obtain an AQM value, from another device associated with the TCP flow (e.g., base station 210), and can compare the RTT value and the AQM value. In this case, TCP sender 240 can verify that the RTT value is lower than the AQM value based on comparing the RTT value and the AQM value. This verification can improve network performance over situations where the RTT value is not lower than the AQM value by reducing or eliminating instances of AQM packet drops.

If the one or more TCP state conditions, associated with the CWND value, are not satisfied (block 430—NO), then process 400 can include returning to block 410 where TCP sender 240 can continue to determine a CWND value associated with the first TCP state. In this case, TCP sender 240 can continue to apply the slow start algorithm until the one or more TCP state conditions are satisfied.

If the one or more TCP state conditions, associated with the CWND value, are satisfied (block 430—YES), then process 400 can include classifying the TCP flow into a second TCP state (block 440). For example, if TCP sender 240 determines that the CWND value satisfies one or more thresholds associated with the second TCP state, then TCP sender 240 can classify the TCP flow into a second TCP state, such as a stable state. In the stable state, TCP sender 240 can maintain the same CWND value for subsequent packet transmissions, or increase the CWND value at a rate that is different than the particular rate.

In some implementations, if TCP sender 240 determines that the CWND value satisfies the slow start threshold and that the RTT value does not satisfy the RTT threshold, then TCP sender 240 can classify the TCP flow into the second TCP state (which is different from the first TCP state). For example, TCP sender 240 can classify the TCP flow into the second TCP state, which can cause TCP sender 240 to maintain the same CWND value during subsequent packet transmissions (e.g., use a CWND value that is greater than the slow start threshold). Alternatively, TCP sender 240 can classify the TCP flow into the second TCP state, which can cause the TCP sender 240 to increase the CWND value at a rate (a first rate) that is different (e.g. slower) than the particular rate associated with the first TCP state.

Additionally, or alternatively, if TCP sender 240 determines that the CWND value satisfies the maximum CWND threshold (regardless of whether the RTT value satisfies the RTT threshold), then TCP sender 240 can classify the TCP flow into the second TCP state. For example, TCP sender 240 can classify the TCP flow into the second TCP state, which can cause TCP sender 240 to maintain the same CWND value during subsequent packet transmissions (e.g., use the maximum CWND threshold as the CWND value). By maintaining the same CWND value, TCP sender 240 can limit a transmit rate based on estimating network congestion associated with the TCP flow (e.g., congestion associated with base station 210), thereby preventing packet loss and/or retransmission timeouts. By preventing network devices from becoming congested, TCP sender 240 conserves network resources.

Additionally, or alternatively, if TCP sender 240 detects packet loss over the TCP flow, then TCP sender 240 can reclassify the TCP flow into the first TCP state, and return to block 410 where TCP sender 240 can determine a CWND value associated with the first TCP state. In this case, TCP sender 240 can continue applying the slow start algorithm, until one or more TCP state conditions are satisfied.

If TCP sender 240 determines that the one or more TCP state conditions, associated with the CWND value and the RTT value, are satisfied (block 430—YES), then process 400 can include classifying the TCP flow into a third TCP state (block 450). For example, if TCP sender 240 determines that the CWND value and the RTT value satisfy thresholds associated with the third TCP state, then TCP sender 240 can classify the TCP flow into the third TCP state, such as a congestion avoidance state. When TCP sender 240 classifies the TCP flow into the congestion avoidance state, TCP sender 240 can reduce network congestion by applying a congestion avoidance algorithm. The congestion avoidance algorithm can reduce network congestion by adjusting the CWND value at a rate (a second rate) that is different than the particular rate used in the previous state. In some cases, TCP sender 240 can apply a congestion avoidance algorithm that increases the CWND value (e.g., at a linear rate of n packets per RTT), that maintains a constant CWND value, that decreases the CWND value (e.g., at a linear rate of n packets per RTT), or the like.

In some implementations, if TCP sender 240 determines that the CWND value satisfies the slow start threshold, and that the RTT value satisfies the RTT threshold, then TCP sender 240 can classify the TCP flow into the third TCP state. For example, TCP sender 240 can classify the TCP flow into the third TCP state, which can cause TCP sender 240 to increase the CWND value at a rate that is different than the particulate rate used in the previous state (e.g., the rate used in the first state and the second state). By classifying the TCP flow into particular states, TCP sender 240 is able to apply the particular state algorithm that prevents AQM packet drop, which causes an increase in throughput for the TCP flow.

As further shown in FIG. 4, process 400 can include determining whether one or more different TCP state conditions are satisfied, based on classifying the TCP flow into the third TCP state (block 460). For example, TCP sender 240 can determine whether one or more different TCP state conditions are satisfied by comparing the RTT value and one or more thresholds. In some implementations, a TCP state condition, of the one or more different TCP state conditions, can be satisfied if the RTT value does not satisfy (e.g., is lower than) the RTT threshold. In some implementations, a TCP state condition, of the one or more different TCP state conditions, can be satisfied if TCP sender 240 has been applying the congestion avoidance algorithm for longer than a threshold time period. In some implementations, a TCP state condition, of the one or more different TCP state conditions, can be satisfied if the RTT value does not satisfy (e.g., is lower than) the RTT threshold, and if TCP sender 240 has been applying the congestion avoidance algorithm for longer than a threshold time period. In some implementations, a TCP state condition, of the one or more different TCP state conditions, can be satisfied if packet loss occurs on the TCP flow. In some implementations, a TCP state condition, of the one or more different TCP state conditions, can be satisfied based on any combination of the above conditions.

Depending on which of the one or more different TCP state conditions are satisfied, TCP sender 240 can reclassify the TCP flow into the first TCP state or the second TCP state, or remain in the third TCP state.

If TCP sender 240 determines that the one or more different TCP state conditions are not satisfied (block 460—NO), then process 400 can include returning to block 450 where the TCP flow remains classified into the third TCP state (block 460). For example, if TCP sender 240 determines that the one or more different TCP state conditions are not satisfied, then TCP sender 240 can continue applying the congestion avoidance algorithm associated with the third TCP state.

If TCP sender 240 determines that the one or more different TCP state conditions are satisfied (block 460—YES), then process can include returning to block 410 where a CWND value, associated with the first TCP state, is determined (block 410). For example, if TCP sender 240 determines that the one or more different TCP state conditions are satisfied, then TCP sender 240 can reclassify the TCP flow into the first TCP state. In this case, TCP sender 240 can reclassify the TCP flow into the first TCP state and apply the slow start algorithm and determine the CWND value. As an example, TCP sender 240 can determine that the RTT value is lower than the RTT threshold, and that TCP sender 240 has been applying the congestion avoidance algorithm for longer than the threshold time period, which can cause TCP sender to reclassify the TCP flow into the first TCP state. As another example, TCP sender 240 can detect packet loss over the TCP flow, which can cause TCP sender 240 to reclassify the TCP flow into the first TCP state. By reclassifying the TCP flow when one or more different TCP state conditions are satisfied, TCP sender 240 efficiently manages network congestion without AQM causing packet drop.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By intelligently transitioning between states based on TCP state conditions, TCP sender 240 is able to manage the CWND value and RTT value in a manner that prevents (or reduces a number of instances of) a network device (e.g., base station 210), associated with the TCP flow, from using AQM to drop packets. In this way, TCP sender 240 increases throughput, and conserves processing resources and network resources.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more processors to:
    determine a congestion window (CWND) value, associated with a slow start transmission control protocol (TCP) state, for a TCP flow that involves one or more devices using active queue management (AQM),
      the slow start TCP state to cause the device to increase the CWND value at a particular rate based on a slow start algorithm;
    determine a round trip time (RTT) value, associated with the slow start TCP state, for the TCP flow;
    determine whether the CWND value satisfies a first threshold and whether the RTT value satisfies a second threshold;
    selectively classify the TCP flow into a different TCP state based on the CWND value and the RTT value,
      the different TCP state being different than the slow start TCP state and including one of:
        a stable TCP state to cause the device to maintain the CWND value,
          the TCP flow being classified into the stable TCP state when the CWND value satisfies the first threshold and the RTT value does not satisfy the second threshold, or
        a congestion avoidance TCP state to cause the device to increase the CWND value at a rate that is different than the particular rate based on a congestion avoidance algorithm,
          the TCP flow being classified into the congestion avoidance TCP state when the CWND value satisfies the first threshold and the RTT value satisfies the second threshold;
    modify the CWND value, as a modified CWND value, based on selectively classifying the TCP flow into the different TCP state; and
    transmit one or more packets, associated with the TCP flow, based on the modified CWND value.

2. The device of claim 1, where the one or more processors, when determining whether the CWND value satisfies the first threshold and whether the RTT value satisfies the second threshold, are to:
  determine that the CWND value satisfies the first threshold,
  determine that the RTT value does not satisfy the second threshold; and
  where the one or more processors, when selectively classifying the TCP flow into the different TCP state, are to:
    classify the TCP flow into the stable TCP state based on determining that the CWND value satisfies the first threshold and that the RTT value does not satisfy the second threshold.

3. The device of claim 1, where the one or more processors, when determining whether the CWND value satisfies the first threshold and whether the RTT value satisfies the second threshold, are to:
  determine that the CWND value satisfies the first threshold; and
  determine that the RTT value satisfies the second threshold; and
  where the one or more processors, when selectively classifying the TCP flow into the different TCP state, are to:
    classify the TCP flow into the congestion avoidance TCP state based on determining that the CWND value satisfies the first threshold and determining that the RTT value satisfies the second threshold.

4. The device of claim 1, where the different TCP state is the congestion avoidance TCP state; and
  where the one or more processors, when causing the device to increase the CWND value at the rate that is different than the particular rate, are to:
  increase the CWND value at a rate that is slower than the particular rate,
    the rate that is slower than the particular rate to cause the RTT value to decrease to a value that is lower than an AQM value associated with another device.

5. The device of claim 1, where the one or more processors, when selectively classifying the TCP flow into the different TCP state, are further to:
  set a rate for increasing or decreasing the CWND value based on the different TCP state.

6. The device of claim 1, where the one or more processors are further to:
  determine whether one or more TCP state conditions are satisfied based on selectively classifying the TCP flow into the different TCP state; and
  reclassify the TCP flow into the slow start TCP state, the stable TCP state, or the congestion avoidance TCP state based on determining whether the one or more TCP state conditions are satisfied.

7. The device of claim 6, where the different TCP state is the congestion avoidance TCP state;
  where the one or more processors, when determining whether the one or more TCP state conditions are satisfied, are to:
    determine that the RTT value does not satisfy another threshold,
    verify that the TCP flow has been in the congestion avoidance TCP state for longer than a threshold period of time; and
  where the one or more processors, when reclassifying the TCP flow, are to:
    reclassify the TCP flow into the slow start TCP state based on determining that the RTT value does not satisfy the other threshold and based on verifying that the TCP flow has been in the congestion avoidance TCP state for longer than the threshold period of time.

8. A non-transitory computer-readable medium storing instructions, the instructions comprising:
  one or more instructions that, when executed by one or more processors of a device, cause the one or more processors to:

determine a congestion window (CWND) value, associated with a slow start transmission control protocol (TCP) state, for a TCP flow that involves one or more devices using active queue management (AQM),
the slow start TCP state to cause the CWND value to be increased at a particular rate based on a slow start algorithm;
determine a round trip time (RTT) value, associated with the slow start TCP state, for the TCP flow;
determine whether the CWND value satisfies a first threshold and whether the RTT value satisfies a second threshold;
classify the TCP flow into a different TCP state based on whether the CWND value satisfies the first threshold and whether the RTT value satisfies the second threshold,
the different TCP state being different than the slow start TCP state and including one of:
a stable TCP state to cause the device to maintain the CWND value,
the TCP flow being classified into the stable TCP state when the CWND value satisfies the first threshold and the RTT value does not satisfy the second threshold, or
a congestion avoidance TCP state to cause the device to increase the CWND value at a rate that is different than the particular rate based on a congestion avoidance algorithm,
the TCP flow being classified into the congestion avoidance TCP state when the CWND value satisfies the first threshold and the RTT value satisfies the second threshold; and
transmit one or more packets, associated with the TCP flow, based on classifying the TCP flow into the different TCP state.

9. The non-transitory computer-readable medium of claim 8, where the one or more instructions, that cause the one or more processors to determine whether the CWND value satisfies the first threshold and whether the RTT value satisfies the second threshold, cause the one or more processors to:
determine that the CWND value satisfies the first threshold
determine that the RTT value does not satisfy the second threshold; and
where the one or more instructions, that cause the one or more processors to classify the TCP flow into the different TCP state, cause the one or more processors to:
classify the TCP flow into the stable TCP state.

10. The non-transitory computer-readable medium of claim 8, where the one or more instructions, that cause the one or more processors to determine whether the CWND value satisfies the first threshold and whether the RTT value satisfies the second threshold, cause the one or more processors to:
compare the CWND value and the first threshold,
compare the RTT value and the second threshold,
determine that the CWND value satisfies the first threshold and that the RTT value does not the second threshold based on a result of comparing the CWND value and the first threshold and a result of comparing the RTT value and the second threshold; and
where the one or more instructions, that cause the one or more processors to classify the TCP flow into the different TCP state, cause the one or more processors to:
classify the TCP flow into the stable TCP state,
the stable TCP state to cause the CWND value to be decreased or to be increased at a rate that is different than the particular rate.

11. The non-transitory computer-readable medium of claim 8, where the one or more instructions, when executed by the one or more processors, further cause the one or more processors to:
determine whether one or more TCP state conditions are satisfied based on classifying the TCP flow into the different TCP state; and
reclassify the TCP flow into the slow start TCP state, a stable TCP state, or a congestion avoidance TCP state based on determining whether the one or more TCP state conditions are satisfied.

12. The non-transitory computer-readable medium of claim 11, where the different TCP state is the congestion avoidance TCP state,
where the one or more instructions, that cause the one or more processors to determine whether the one or more TCP state conditions are satisfied, cause the one or more processors to:
determine that the RTT value does not satisfy another threshold,
verify that the TCP flow has been in the congestion avoidance TCP state for longer than a threshold period of time,
determine that a TCP state condition, of the one or more TCP state conditions, is satisfied, based on determining that the RTT value does not satisfy the other threshold and verifying that the TCP flow has been in the congestion avoidance TCP state for longer than the threshold period of time; and
where the one or more processors, when reclassifying the TCP flow, are to:
reclassify the TCP flow into the slow start TCP state.

13. The non-transitory computer-readable medium of claim 8, where the one or more instructions, when executed by the one or more processors, further cause the one or more processors to:
increase the CWND value at a rate that is slower than the particular rate,
the rate that is slower than the particular rate to cause the RTT value to decrease.

14. The non-transitory computer-readable medium of claim 8, where the one or more instructions, when executed by the one or more processors, further cause the one or more processors to:
obtain an AQM value, from another device, for the TCP flow;
compare the RTT value and the AQM value; and
verify that the RTT value is lower than the AQM value based on comparing the RTT value and the AQM value.

15. A method, comprising:
determining, by a device, a congestion window (CWND) value, associated with a slow start transmission control protocol (TCP) state, for a TCP flow that involves one or more devices using active queue management (AQM),
the slow start TCP state to cause the device to increase the CWND value at a particular rate based on a slow start algorithm;
determining, by the device, a round trip time (RTT) value, associated with the slow start TCP state, for the TCP flow;

determining, by the device, whether the CWND value satisfies a first threshold and whether the RTT value satisfies a second threshold, based on the CWND value and the RTT value;

classifying, by the device, the TCP flow into another TCP state, based on determining whether the CWND value satisfies the first threshold and whether the RTT value satisfies the second threshold, the other TCP state including one of:

a stable TCP state to cause the device to maintain the CWND value, the TCP flow being classified into the stable TCP state when the CWND value satisfies the first threshold and the RTT value does not satisfy the second threshold, or a congestion avoidance TCP state to cause the device to increase the CWND value at a rate that is different than the particular rate based on a congestion avoidance algorithm, the TCP flow being classified into the congestion avoidance TCP state when the CWND value satisfies the first threshold and the RTT value satisfies the second threshold;

modifying, by the device, the CWND value, as a modified CWND value, based on classifying the TCP flow into the other TCP state; and transmitting, by the device, one or more packets, associated with the TCP flow, based on the modified CWND value.

16. The method of claim 15, further comprising:
classifying the TCP flow into the stable TCP state.

17. The method of claim 15, where determining whether the CWND value satisfies the first threshold and whether the RTT value satisfies the second threshold comprises:

determining that the CWND value satisfies a maximum CWND threshold, and determining that a TCP state condition, of the one or more TCP state conditions, is satisfied based on determining that the CWND value satisfies the maximum CWND threshold.

18. The method of claim 15, further comprising:

determining whether one or more TCP state conditions are satisfied based on classifying the TCP flow into the other TCP state; and reclassifying the TCP flow into the slow start TCP state, or into the other TCP state, based on determining whether the one or more TCP state conditions are satisfied.

19. The method of claim 18, where determining whether the one or more TCP state conditions are satisfied comprises:

determining that the RTT value does not satisfy another threshold, verifying that the TCP flow has been in the congestion avoidance TCP state for longer than a threshold period of time, determining that a TCP state condition, of the one or more TCP state conditions, is satisfied, based on determining that the RTT value does not satisfy the other threshold and verifying that the TCP flow has been in the other TCP state for longer than the threshold period of time; and where reclassifying the TCP flow comprises:

reclassifying the TCP flow into the slow start TCP state.

20. The method of claim 15, further comprising:

obtaining an AQM value, from another device, for the TCP flow;

comparing the RTT value and the AQM value; and verifying that the RTT value is lower than the AQM value based on comparing the RTT value and the AQM value.

* * * * *